United States Patent [19]

Rocklitz et al.

[11] Patent Number: 5,066,400

[45] Date of Patent: Nov. 19, 1991

[54] SELF-SPACED PLEATED FILTER

[75] Inventors: Gary J. Rocklitz; Douglas G. Crofoot, both of Burnsville; Richard L. Zelinka, Maplewood, all of Minn.

[73] Assignee: Donaldson Company, Inc., Bloomington, Minn.

[21] Appl. No.: 595,177

[22] Filed: Oct. 9, 1990

[51] Int. Cl.⁵ .................... B01D 27/06; B01D 29/21
[52] U.S. Cl. .................. 210/493.5; 210/494.1; 55/500; 55/521
[58] Field of Search ............. 55/485, 497, 500, 521; 210/493.1, 493.3, 493.5, 494.1

[56] References Cited

U.S. PATENT DOCUMENTS

| | | | |
|---|---|---|---|
| 1,729,135 | 9/1929 | Slauson | 210/457 |
| 2,190,886 | 2/1940 | Schaaf et al. | 183/71 |
| 2,210,397 | 8/1940 | Dreiss | 210/169 |
| 2,322,548 | 6/1943 | Sigmund | 183/70 |
| 2,397,759 | 4/1946 | Sigmund | 183/71 |
| 2,494,431 | 1/1950 | Eckstein | 154/30 |
| 2,599,604 | 6/1952 | Bauer et al. | 210/169 |
| 2,663,660 | 12/1953 | Layte | 154/81 |
| 2,714,340 | 8/1955 | Brown | 92/39 |
| 2,784,802 | 3/1957 | Bub et al. | 183/71 |
| 2,908,350 | 10/1959 | Buckman | 183/44 |
| 2,915,426 | 12/1959 | Poelman | 154/93 |
| 2,936,855 | 5/1960 | Allen et al. | 183/71 |
| 2,945,559 | 7/1960 | Buckman | 183/71 |
| 3,020,977 | 2/1962 | Huppke et al. | 183/73 |
| 3,025,963 | 3/1962 | Bauer | 210/493 |
| 3,037,637 | 6/1962 | Bub | 210/487 |
| 3,057,771 | 10/1962 | Schenck | 162/116 |
| 3,070,937 | 1/1963 | Bub | 55/387 |
| 3,178,494 | 4/1965 | Tisdale | 264/90 |
| 3,198,336 | 8/1965 | Hyslop | 210/457 |
| 3,322,617 | 5/1967 | Osborne | 162/296 |
| 3,337,388 | 8/1967 | Wosaba | 161/63 |
| 3,351,920 | 10/1970 | Hart | 55/497 |
| 3,401,077 | 9/1968 | Zink | 162/117 |
| 3,401,803 | 9/1968 | Bub | 210/488 |
| 3,481,830 | 12/1969 | Hanke | 162/296 |
| 3,540,079 | 11/1970 | Bush | 18/19 |
| 3,692,615 | 9/1972 | Ohmori | 425/370 |
| 3,799,354 | 3/1974 | Buckman et al. | 210/493 |
| 3,807,150 | 4/1974 | Maracle | 55/498 |
| 3,858,793 | 1/1975 | Dudrey | 233/2 |
| 3,871,851 | 3/1975 | Neumann | 55/521 |
| 3,993,425 | 11/1976 | Dunn et al. | 425/370 |
| 4,102,792 | 7/1978 | Harris | 210/457 |
| 4,252,591 | 2/1981 | Rosenberg | 156/203 |
| 4,268,290 | 5/1981 | Barrington | 55/521 |
| 4,410,427 | 10/1983 | Wydeven | 210/317 |
| 4,410,458 | 2/1979 | Evert | 425/387 |
| 4,610,706 | 9/1986 | Nesher | 55/497 |
| 4,708,724 | 11/1987 | Agnew | 55/500 |

FOREIGN PATENT DOCUMENTS

| | | | |
|---|---|---|---|
| 5311 | 11/1955 | Fed. Rep. of Germany | 55/521 |
| 2951316 | 7/1981 | Fed. Rep. of Germany | |
| 3300293 | 7/1984 | Fed. Rep. of Germany | 55/521 |
| 393022 | 12/1908 | France | 55/521 |

OTHER PUBLICATIONS

"Hepa Filters for Every Application", Flanders Filters, Inc., 1988 product literature.
"Dimple-Pleat Filters", Flanders Filters, Inc., Product Bulletin No. 871, 1987.
"Crossflow Catalytic Afterburner" (source unknown).

Primary Examiner—Robert A. Dawson
Assistant Examiner—Wanda L. Millard
Attorney, Agent, or Firm—Merchant, Gould, Smith, Edell, Welter & Schmidt

[57] ABSTRACT

A self-spaced pleated filter element is provided having panel elements including repeating cycles of corrugations separated by spans of uncorrugated filter material.

12 Claims, 4 Drawing Sheets

SELF-SPACED PLEATED FILTER

TECHNICAL FIELD

The present invention relates to fluid filtering devices and more particularly to a corrugated filter media.

BACKGROUND OF THE INVENTION

Pleated filter elements are known and used in many industrial fluid filtration systems. Pleated filters, such as those having a round cartridge configuration are commonly used in engine air cleaner applications. High efficiency particulate air filters (HEPA) and ultra low penetration air filters (ULPA) of various designs are available and used in atomic, chemical, pharmaceutical and computer industries. Health care facilities such as, operating rooms and laboratories also use HEPA filters to provide clean air environments. The rectangular flat panel type filter element is widely used in applications where HEPA or ULPA filter performance is necessary.

One problem associated with pleated filter elements is optimizing filter performance. An "ideal" pleated filter media should exhibit the following characteristics. One, perfectly straight "V" shaped pleats. This configuration provides the lowest resistance to fluid flow through the element and a uniform distribution of flow or fluid velocity across the entire surface of the filter. Two, highest pleat spacing (density) possible. Maximum density provides the greatest fluid flow for a given package size at the lowest practical pressure loss; or stated in another way, use of the least amount of filter media area (lowest raw material cost) to achieve the desired flow and pressure loss is desired. Three, in some applications, sufficient space between pleats to allow for dust cake buildup (i.e., dirt capacity) is desired. To date, the problem of forming and maintaining this "ideal" or optimum configuration both in the filter manufacturing process and during operation of the filter has yet to be resolved. Currently used filter media exhibit anomalies associated with poor filter construction quality and dynamic changes that occur when the forces generated by fluid flow distort the pleat shape from the "ideal".

The most common method used to improve performance of pleated filter media is to form continuous corrugations across the length of the pleat face, as is done in many types of engine filter designs. In most of these applications cellulose fibers or a combination of cellulose and synthetic fibers are chosen along with a resin binder to create this filter medium. These combinations are usually quite pliable or moldable. The typical practice is to use two cylindrical embossing rolls having a matched pattern extending entirely around the periphery of each and repeating continuously in a symmetrical arrangement across the roll face (length), feeding the flat filter medium between them to impart a contour that matches the corrugation pattern of the rolls. The intent is to create a structure that when pleated limits distortion of the "ideal" pleat shape by allowing contact only between tips of corrugations. However, this approach precludes the filter from reaching its greatest potential. Specifically, fluid flow through the filter media area covered by the contact of corrugation tips is essentially prevented by what is commonly referred to as "masking".

Continuous corrugation of filter media is generally limited to those materials made from substantially cellulose or synthetic fibers or combinations of them. Filter media incorporating a substantial degree of glass fiber, especially micro-fiberglass and combinations of glass and synthetic fibers in conjunction with very low amounts of binder resin such as found in HEPA, ULPA, and ASHRAE rated industrial air filtration applications generally cannot be continuously corrugated. These materials typically have a very low stiffness. It is, therefore, more difficult to fabricate and maintain the "ideal" pleat shape. These materials also exhibit a limited elongation or deformation potential with respect to cellulose based filter media. When run through a continuous corrugation roll process the media frequently is ruptured.

The common practice to create the "ideal" pleat shape for materials that are difficult to corrugate is to leave the entire surface of the sheet flat and insert or add a mechanical means to "space" apart or shape the pleat. These "spacers" often take the form of corrugated aluminum sheets between pleats, another method is the use of adhesive coated strings spaced apart and applied to the surface of the media. Still another method is to use polymeric extrusion of continuous beads spaced apart and allowed to harden to form a mechanical separator. As will be realized, a mechanical (impervious) device inserted within the pleat or between pleats will create a significant degree of media masking. Further, the inclusion of these devices results in additional cost of materials used to fabricate the filter element.

Most known materials suitable for these applications will rupture at the pleat tip if continuous corrugations are used. One recently available type of filter material is composed of substantially all glass fiber which can be embossed with an interrupted corrugation (commonly referred to as dimples). These dimples separate and hold pleats apart. Circular dimples, as well as elongated cigar shapes and continuous protrusions similar to corrugations seen commonly in cellulosic filter materials have been used. While filters using "self-spaced" media are known (see, e.g. U.S. Pat. No. 4,610,706 to Nesher; U.S. Pat. No. 2,945,559 to Buckman), significant limitations on filter life and efficiency due to bunching, bagging and deformation of filter pleats still exist.

Accordingly, there is a need for a "self-spaced" pleated filter element that optimizes filter performance by exhibiting minimal masking from airflow and dust (i.e. minimal media blockage due to adjacent pleats or adjacent sides of same pleat being pressed together) and providing a prestressed pleat face that reduces adjacent pleat face contact during pressure loading of the filter media.

SUMMARY OF THE INVENTION

The present invention provides a pleated filter media for use in a filter assembly for fluid filtration. While the invention is preferably directed to a pleated filter media for use in a filter assembly to remove particulate matter from gaseous fluid it is also directed to a product useful in all forms of fluid filtration.

The pleated filter element of the present invention is composed of a sheet of filter media having a plurality of panel sections. Each panel section includes repeating units or cycles of formed corrugations. The repeating units of corrugations are separated by spans of uncorrugated media. In a preferred embodiment, each repeating cycle has at least one complete corrugation and one-half corrugation end to the cycle. Most preferably, the cycle of formed corrugations is one and one-half corrugations.

The corrugations of the present invention filter element can be formed by corrugating rolls, embossing rolls or vacuum formation such as wet vacuum techniques. In one embodiment the corrugations are interrupted resulting in cigar or dimple shapes. In one preferred embodiment the interrupted corrugations are formed at the pleat score. Alternatively, continuous corrugations through the pleat score can be employed in the present invention.

The filter element of the present invention can be constructed of various materials depending on the intended use. In air cleaners for internal combustion engines, the filter element can be made of paper. In one preferred embodiment, the filter element is utilized as a HEPA filter. In this case, fiber glass or synthetic fibers are suitable filter materials.

The pleated filter element of the present invention, can be employed at high pleat concentrations with minimal pleat deformation and adjacent pleat contact; thereby providing more usable surface for dust loading, while reducing the total media surface area per filter element.

According to the present invention, a pleated filter element is provided that optimizes filter performance by minimizing masking and providing prestressed pleat shapes that are self spacing in the form of the "ideal configuration". The present invention provides a pleat design which allows use of low-stiffness material, such as micro-fiberglass based materials, that can be used at flow rates that would otherwise cause distortion of the "ideal pleat" shape thereby resulting in higher than optimum pressure drop. The filter element of the present invention addresses both anomalies associated with poor filter construction quality and dynamic changes that occur when forces generated by fluid flow distort the pleat shape from the "ideal".

These and various other advantages and features of novelty which characterize the invention are pointed out with particularity in the claims annexed hereto and forming a part hereof. However, for better understanding the invention, its advantages and objects attained by its use, reference should be had to the drawings which form a further part hereof and the accompanying descriptive matter in which there is illustrated and described a preferred embodiment of the invention.

DETAILED DESCRIPTION OF THE INVENTION

Figure 1:
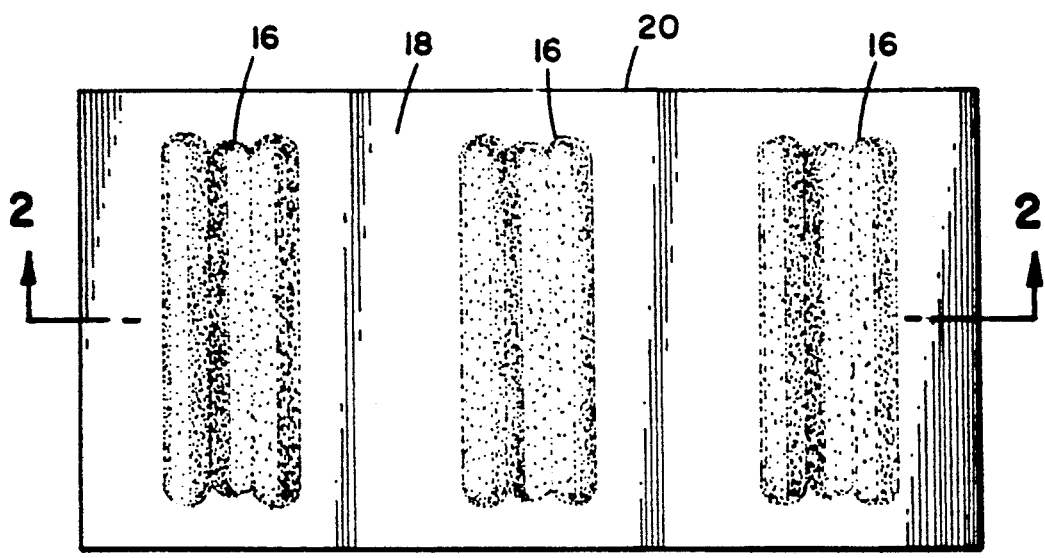
FIG. 1 is a plan view of a single panel sheet of filter media showing the corrugation cycle of the present invention.
Figure 2:
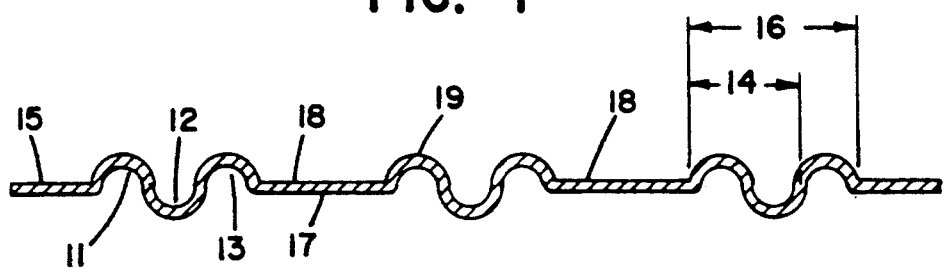
FIG. 2 is an enlarged side view of the filter media sheet in FIG. 1 taken along line 2—2.

As mentioned above, the present invention provides a unique "self-spaced" filter element that exhibits minimal masking from air flow and dust and provides a prestressed pleat face that reduces adjacent pleat face contact during pressure loading of the filter media. The filter element of the present invention optimizes performance of pleated media by achieving the "ideal" configuration described herein. Referring to the drawings, and more particularly to FIGS. 1-6, a filter element in accordance with the invention is therein shown. FIGS. 1 and 2 show one preferred embodiment of a single panel 20 of a filter media according to the present invention. As shown in FIG. 1 the panel 20 of filter media is comprised of alternating repeating cycles 16 of formed corrugations separated by spans of uncorrugated media 18.

In the present specification, the term "corrugation" refers to a pair of imprints or wrinkles in opposing surfaces of a sheet of filter media. One corrugation is defined by a paired ridge and groove in the media. As shown in FIG. 2, one corrugation 16 is represented by imprint 11 on a first side 15 of the media 10 together with opposing imprint 12 in the opposite or second side 17 of filter media 10. According to the present invention, each repeating cycle of formed corrugation 16 is separated by a flat and uninterrupted free span 18 of media material. In the preferred embodiment shown in FIGS. 1-6, each cycle 16 of formed corrugations has at least one complete corrugation 14 having a ridge 11 and groove 12 and a one-half corrugations end 13 to each cycle. While the repeating cycle 16 of formed corrugations can include a varied number of complete (ridge 11 and grove 12) corrugations 14 (e.g., 1, 2 or 3); in the present invention, each repeating cycle 16 has a one half corrugations end to the cycle. In the preferred embodiment shown in the figures, the repeating cycle 16 of formed corrugations is defined by one and one half corrugations 11, 12, 13.

Figure 3:
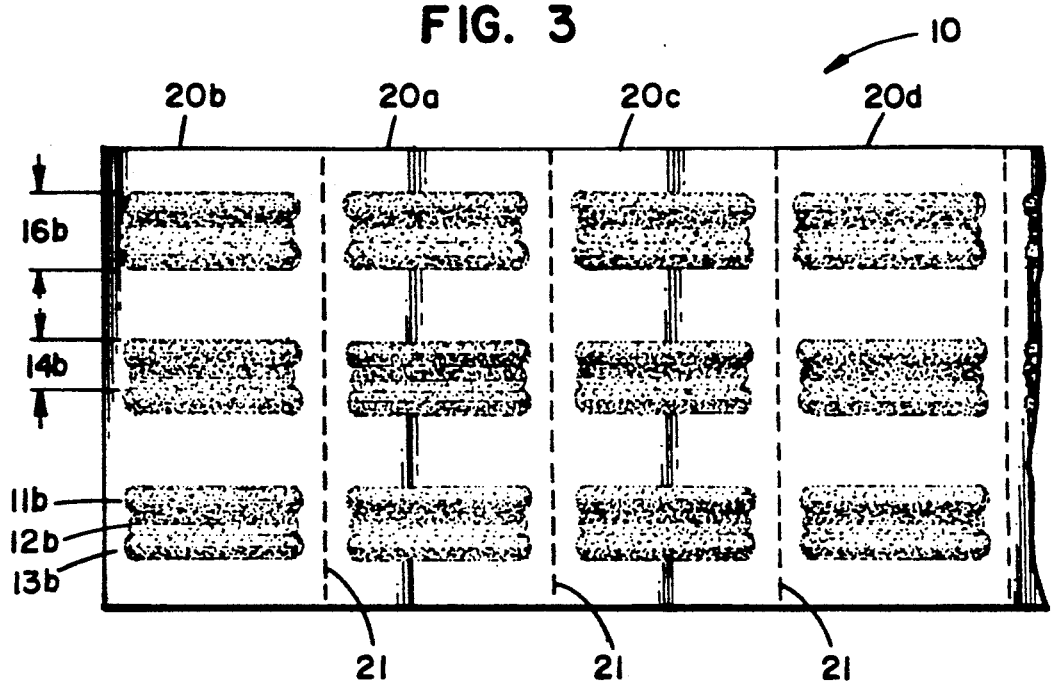
FIG. 3 is a plan view of a sheet of unfolded filter media of the present invention showing a plurality of panel sections having repeating cycles of corrugations.
Figure 6:
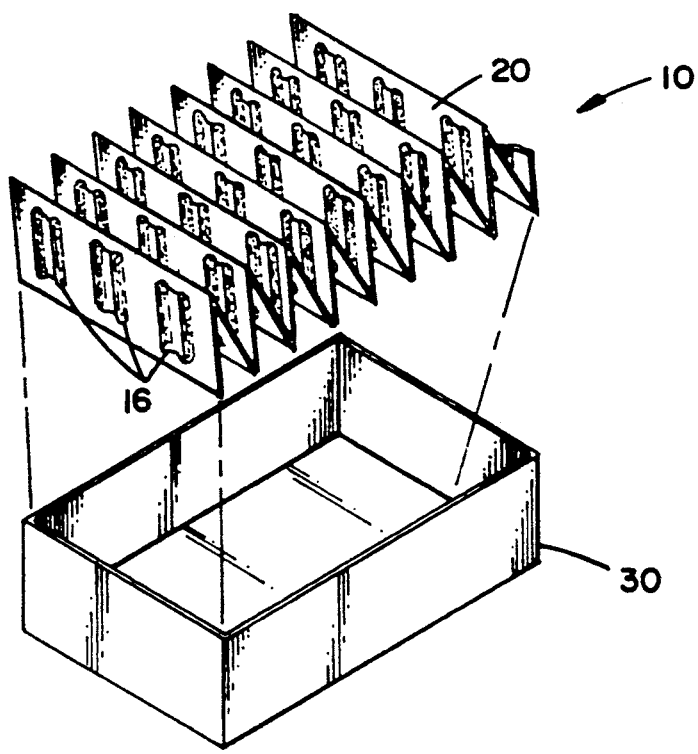
FIG. 6 is an exploded perspective view of a filter incorporating the folded filter element of the present invention.

In FIG. 3, one preferred embodiment of a sheet of filter media having a plurality of continuous panel sections 20 of the type in FIG. 1 is shown. In FIG. 3, adjacent panel sections 20a–d use the same numbers for corresponding features of each panel (e.g. 15a, 15b, 15c for first surface of panels 20a, 20b, 20c, respectively). Between adjacent panels 20a–20b, 20a–20c crease or fold lines 21 are provided to facilitate the pleating of the filter media 10 for insertion into a filter frame 30 as seen in FIG. 6. When folded the filter element shown in FIG. 3 provides a self supporting media, in which adjacent panels form a structure having a cross section such as seen in FIG. 9.

Figure 4:
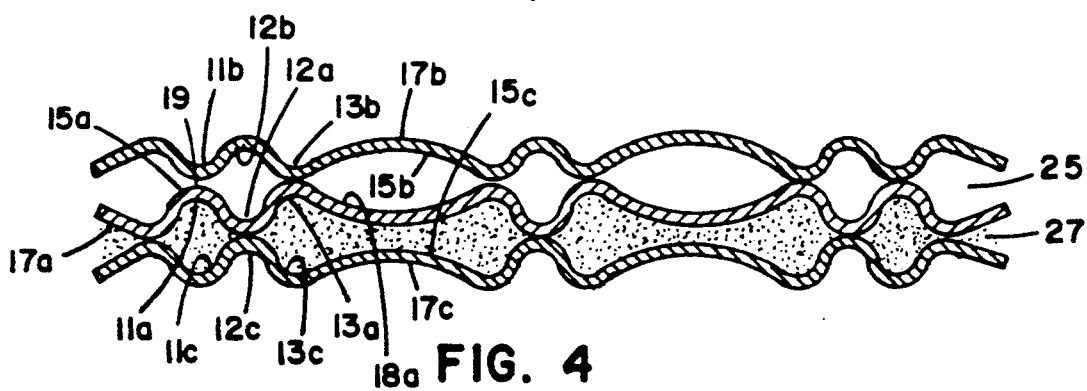
FIG. 4 is an enlarged cross-sectional view of a folded sheet of filter media according to the present invention showing the touching of corrugations with compression loading.
Figure 5:
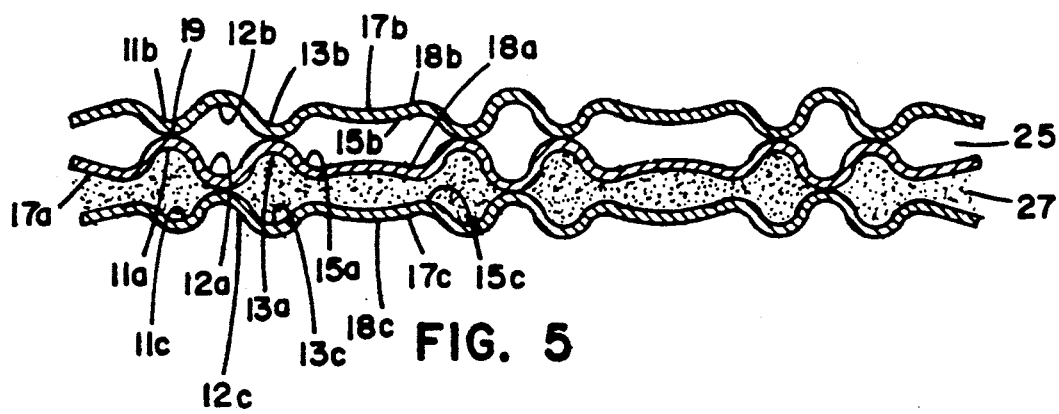
FIG. 5 is an enlarged cross-sectional view of a folded sheet of the filter media of the present invention showing the resulting position due to the opposing forces of compression and fluid flow.
Figure 9:
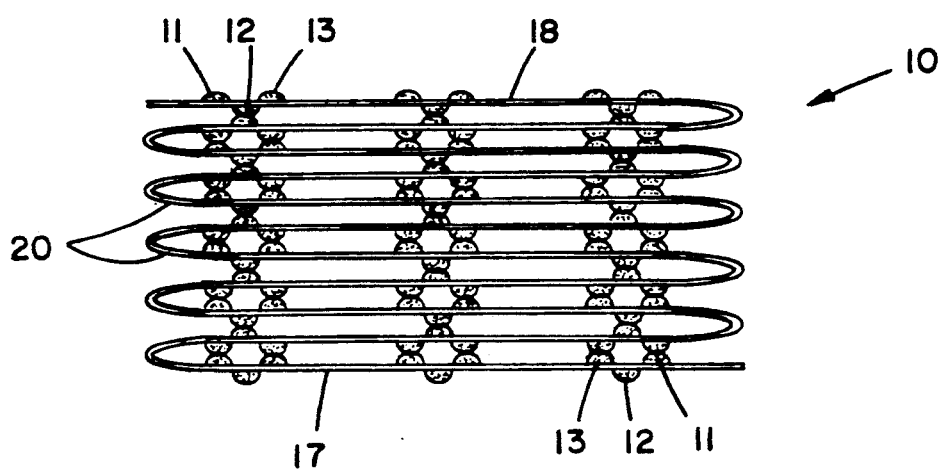
FIG. 9 is an enlarged cross-sectional view of a folded sheet of filter media according to the present invention showing the touching of corrugations with no pressure loading.

The ability of the pleated filter element 10 of the present invention to minimize pleat deformation and adjacent pleat contact is best shown with reference to FIG. 4 and 5 which represent cross sectional views of a folded sheet of filter media as seen in FIG. 9 in which the corrugations touch under compression without fluid flow and with fluid flow, respectively. In FIGS. 4 and 5, as in FIG. 3, similar features of adjacent panels are represented by corresponding numbers.

Referring to FIGS. 4 and 5, the repeating cycles 16 of corrugations are uniformly formed in the filter media 10 so that when the filter sheet is folded along the score lines 21 the corrugations of the repeating cycles 16 contact or abut one another at corresponding points along the corrugations 11, 12, 13 of the media 10. More specifically, when folded, panels 20a, 20b, 20c in FIG. 3 form a pleated media 10 such as seen in FIG. 6 in which first surfaces 15a, 15b of adjacent panels 20a, 20b are in contact and second surfaces 17a, 17c of adjacent panels 20a, 20c are in contact with one another. When pleated, first surfaces 15a, 15b of panel sections 20a, 20b contact each other at the apex 19 of first corrugation sections 11a, 11b and apex 19 of half corrugation sections 13a, 13b. Second surface 17a of panel 20a is in cooperative alignment with second surface 17c of panel 20c with second corrugation sections 12a, 12c in contact at their respective apexes 19. The folded media 10 thereby defines opposing clean air 25 and dirty air 27 sides of the filter media 10. It will be appreciated that folding of additional continuous panel sections of media in the manner described above will produce self-spaced pleats in which adjacent panel sections contact each other only at the apex of corresponding corrugations.

The uniform contact of the repeating cycles 16, of formed corrugations provides a self-supporting filter element which minimizes pleat deformation and adjacent pleat contact. The one and one-half cycle corrugation of the filter element allows the filter media to be pre-stressed in the direction opposite fluid flow for better resistance to deformation. As seen best in FIG. 5, when the filter element of the present invention is pressure loaded, contact between opposing sheets of filter media 20 along the repeating cycle of corrugations 16 minimizes the deformation in the free span 18 areas 18a, b; 18a, c between the repeating cycles 16 of corrugations. This maximizes the dust loading capacity of the filter media on the dirty air side 27 while minimizing contact between adjacent pleats on the clean air side 25 of the media.

In the preferred design shown in FIGS. 1-6 and 9, the number of corrugations is reduced by creating a flat portion between each one and one-half cycle of corrugation and therefore reducing the overall quantity of masking points for a given amount of pleated filter area. In a preferred embodiment, the span of uncorrugated media is about 0.5 to about 5 times the length of the cycle of formed corrugations. We have determined that by imparting a degree of compression on the pleated filter media pack (media pack referring to without the rigid frame) that with the one and one-half cycle corrugation design of the present invention a bending force or moment is applied to each end of the flat portion of media opposing or opposite the direction of fluid flow. Thus the "ideal" shape can be maintained for fluid forces (pressure drops) greater than previously achieved. An added advantage then is that for a lower stiffness (related to the amount and nature of fiber and binder used to create the filter medium) a filter according to the present invention can maintain the "ideal" pleat shape. In other words, it is possible to use a lower cost - lower stiffness filter media to achieve the same result.

The filter media of the present invention can be formed from any number of materials depending on the intended use of the filter media. In the case of HEPA, ULPA, or ASHRAE media, materials such as glass fibers or synthetic fibers are preferred. In other applications of the present invention, such as internal combustion engine filters, a paper filter may be preferred.

The corrugations formed in the filter media 10 of the present invention can be formed by a number of known manufacturing processes known to those of skill in the art, including corrugations rolls, embossing rolls and vacuum processes, such as wet vacuum techniques.

Figure 7:
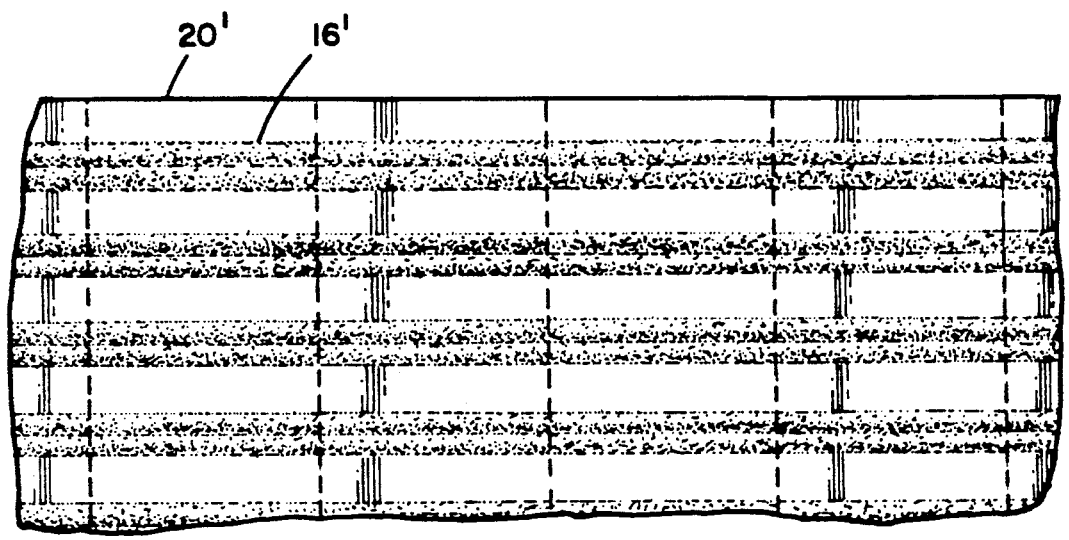
FIG. 7 shows an alternate embodiment of the corrugation cycle of the present invention.
Figure 8:
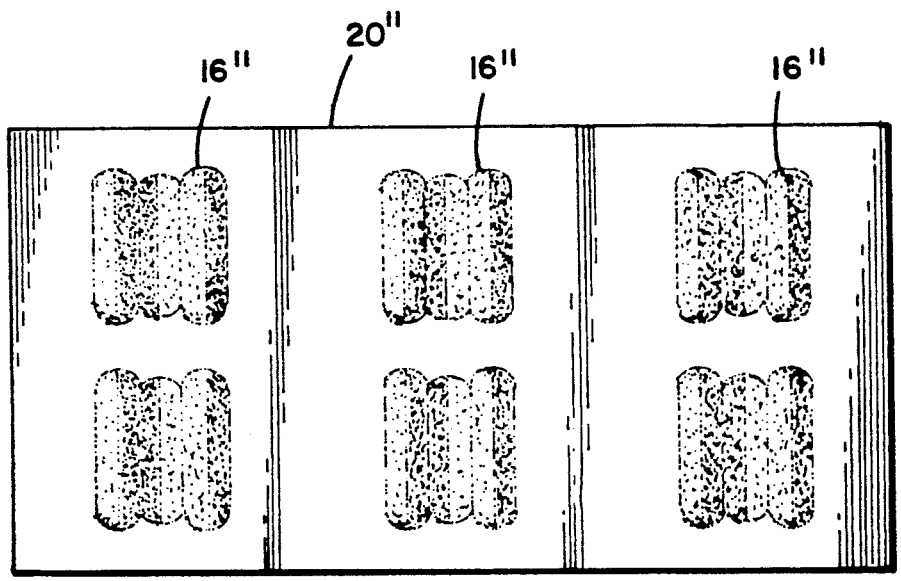
FIG. 8 shows another alternate embodiment of the corrugation cycle of the present invention.

As described above, FIGS. 1-6 and 9 refer to one preferred embodiment, in which the corrugation cycles are formed in panel sections that are interrupted at the score line 21. The present invention can also be employed utilizing repeating cycles of continuous corrugations 16' such as seen in FIG. 7. Further, in another alternate embodiment the repeating cycle of formed corrugations 16" can be interrupted in the manner shown in FIG. 8, forming a plurality of smaller dimple or dimple-like corrugations 11", 12", 13".

From the foregoing, it will be seen that the present invention provides a filter element having a unique construction that can be employed at high pleat concentrations with minimal pleat deformation and adjacent pleat contact; thereby providing a more usable surface for dust loading, while reducing the total media surface area per filter element.

What is claimed is:

1. A pleated filter element comprising:
   a sheet of filter media having a plurality of panel sections, each panel section having alternating repeating cycles of formed corrugations and a span of uncorrugated media, each cycle of formed corrugations having at least one complete corrugation and a one-half corrugation end to each cycle.

2. The filter element of claim 1 wherein said cycle of formed corrugations is a repeating cycle of one and one half corrugations.

3. The filter element of claim 2 wherein said span of uncorrugated media is about 0.5 to 5 times the length of said cycle of formed corrugations 4. The filter element of claim 1 wherein said filter element is a HEPA filter.

5. The filter element of claim 4 wherein said filter element is composed of glass fiber.

6. The filter element of claim 1 wherein said corrugations are interrupted.

7. The filter element of claim 1 wherein said corrugations are interrupted at a score separating adjacent panel sections.

8. The filter element of claim 1 wherein said corrugations are formed by corrugating rolls.

9. The filter element of claim 1 wherein said corrugations are formed by embossing rolls.

10. The filter element of claim 1 wherein said corrugations are vacuum formed.

11. The filter element of claim 1 wherein said corrugations are continuous corrugations through a score separating adjacent panel sections.

12. A filter element comprising:
   a sheet of filter media material having a plurality of repeating cycles of formed corrugations said repeating cycles separated from one another by a span of uncorrugated media, each repeating cycle having at least one complete corrugation and a one-half corrugation end to the cycle.

* * * * *